United States Patent [19]

Beiser

[11] 3,739,296
[45] June 12, 1973

[54] LASER SYSTEMS AND LASER CONTROL SYSTEMS
[75] Inventor: Leo Beiser, Flushing Manor, N.Y.
[73] Assignee: Columbia Broadcasting System, Inc., New York, N.Y.
[22] Filed: Dec. 18, 1970
[21] Appl. No.: 99,661

Related U.S. Application Data
[63] Continuation of Ser. No. 750,256, Aug. 5, 1968, abandoned.

[52] U.S. Cl. ... 331/94.5 K, 331/94.5 D, 331/94.5 P
[51] Int. Cl. .............................................. H01s 3/00
[58] Field of Search .................................. 331/94.5

[56] References Cited
UNITED STATES PATENTS
| | | | |
|---|---|---|---|
| 3,628,177 | 12/1971 | Hammer | 331/94.5 |
| 3,293,565 | 12/1966 | Hardy | 331/94.5 |
| 3,321,714 | 5/1967 | Tien | 331/94.5 |
| 2,511,517 | 6/1950 | Spiegel | 49/77 |
| 3,379,998 | 4/1968 | Soules et al. | 331/94.5 |

OTHER PUBLICATIONS

Pole: "Active Optical Imaging System, IBM Technical Disclosure Bulletin," Vol. 7, pg. 1,200, May, 1965
Hammer: "Electron–Pumping of Noble Gas for Lasers," Applied Physics Letters, Vol. 7, pp. 159–161, Sept. 15, 1965
Pole et al: "Electron Beam Scan Laser," IEEE Jour. of Quant. Electronics, Vol. QE-2, pp. 182–184, July, 1966

Primary Examiner—Ronald L. Wibert
Assistant Examiner—Edward S. Bauer
Attorney—Brumbaugh, Graves, Donohue & Raymond

[57] ABSTRACT

A laser resonator includes nodally-mounted, passive, refractive or reflective image-forming means separate from the lasing medium and conjugate reflective surfaces on which conjugate images are formed. Activation of a desired mode or modes of the laser is achieved by selective excitation.

22 Claims, 13 Drawing Figures

PATENTED JUN 12 1973

INVENTOR.
LEO BEISER

BY Brumbaugh, Graves, Donohue & Raymond his ATTORNEYS

INVENTOR.
LEO BEISER his ATTORNEYS

PATENTED JUN 12 1973 3,739,296

INVENTOR.
LEO BEISER
BY
Brumbaugh, Graves, Donohue & Raymond
his ATTORNEYS

LASER SYSTEMS AND LASER CONTROL SYSTEMS

This application is a continuation of abandoned application Ser. No. 750,256, filed Aug. 5, 1968.

BACKGROUND OF THE INVENTION

This invention relates to laser systems and laser control systems. More particularly, it relates to novel and highly-effective laser systems in which a complete separation is achieved between active and passive elements and laser control systems in which the laser modes are selectively established by the spatial positioning of laser excitation.

Laser systems and laser control systems are known and are disclosed, for example, in British Patents No. 1,055,839 and No. 1,055,840.

Some prior laser systems suffer, however, from the disadvantage that the active lasing medium also serves a passive (refractive) function, requiring a compromise, a result of which is spherical or off-axis aberration, degrading focus and resolving power.

Prior laser control systems also suffer from the disadvantage of operation at the mode ends, necessitating an extremely small control cross-section. Moreover, prior laser control systems operate by selective reduction of optical loss rather than by selective excitation. Thus, since laser power output is a very sensitive function of optical loss, extremely critical uniformity of optical loss is required over the scanned surface (the control element of many prior art devices).

SUMMARY OF THE INVENTION

An object of the present invention is to remedy the deficiencies of conventional structure outlines above. In particular, an object of the invention is to provide, in a laser system, complete separation of means performing active and passive functions. Another object of the invention is to effect control of laser modes of oscillation by selective excitation of desired modes rather than selective reduction of optical loss. Another object of the invention is to provide for idling as a means of reducing the power demand upon the control system. A further object of the invention is to provide for operation of a control system, in laser scanning apparatus capable of diffraction-limited resolution, within an optical mode (i.e., spaced apart from the mode endings), so that the control cross-section need not be as fine as the mode endings (in contrast to the prior apparatus referred to above).

The foregoing and other objects of the invention are attained, in a representative embodiment thereof, by the provision of cavity-defining means including cylindrically or spherically curved-surface means, the surface means being partially reflective inwardly. Lens means having a positive focal length is mounted within the cavity concentrically with the surface means, and a lasing medium is contained within the cavity between the surface means and the lens means. The lens means produces conjugate foci on the surface means.

In place of the lens means, central reflector means may be provided at the origin of the radius of the curved-surface means for producing an optical folding at a nodal point.

The objects of the invention are further attained by the provision, in a representative embodiment of a laser control system according to the invention, of idler means for pumping a laser medium to a level below the lasing threshold and excitation means for selectively activating desired modes.

In certain embodiments, the excitation means is a beam of electrons generated by a gun within the lasing gaseous medium. In other embodiments, the primary electrons from the gun traverse a hard vacuum at lower pressure than the pressure of the lasing gaseous medium and generate a secondary electron flux which directly activates the desired modes in a separately-contained lasing medium.

In any of the foregoing embodiments, scanning through an angle up to 360° (and multiples thereof) in a plane normal to a designated axis is attained by mounting scanning, positioning, and shaping means for controlling an electron beam used for selective excitation symmetrically along such axis.

Lasing in desired modes where a limited scan magnitude is sufficient may also be selectively caused by use of a modified Pierce gun mounted in one of the optical paths between the central lens or reflector and the curved-surface means, the laser being mounted in the optical path between the central lens or reflector and the conjugate surface.

BRIEF DESCRIPTION OF THE DRAWING

Other aspects of the invention can be understood from a consideration of the following detailed description of several representative embodiments thereof and of the accompanying figures in the drawing, wherein.

DESCRIPTION OF THE PREFERRED EMBODIMENTS

Figure 1:
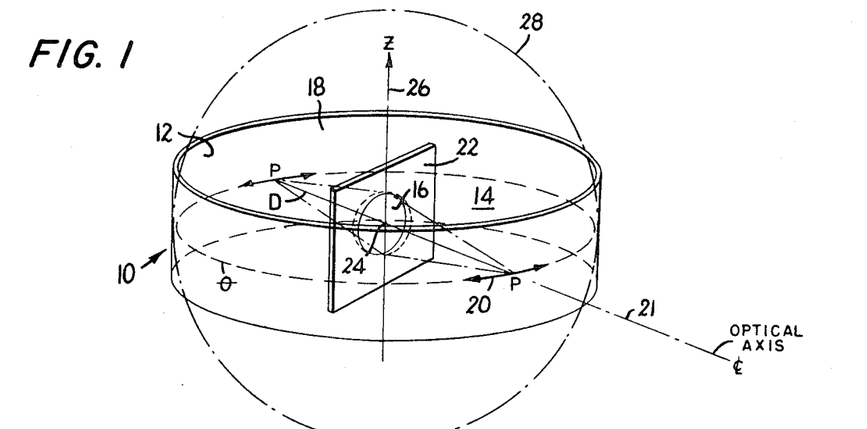
FIG. 1 is a highly schematic perspective view of a first embodiment of a laser system according to the invention, facilitating an understanding of the broad principles of laser systems according to the invention.

FIG. 1 shows schematically and in perspective apparatus 10 according to the invention. The apparatus 10 includes cylindrically curved-surface means 12 at least partially reflective inwardly toward a cavity 14 within, and defined in part by, the surface 12. A lens 16 having a positive focal length equal to half the radius of curvature of the surface means 12 is mounted within the cavity 14 concentrically with the surface 12, and a lasing medium 18, which may be HeNe, Cl+, Ar+, Hg++, or another gas or metal vapor, is contained within the cavity 14 between the surface 12 and the lens 16 by upper and lower walls (not shown in FIG. 1).

The choice of the gas or metal vapor depends on a number of factors that those skilled in the art will readily understand. In the case where the objective is to scan or record on film, the spectral output is to be in the region roughly described as "visible," but may extend into the near UV or IR, limited by the spectral ranges of emulsion sensitivities and photocathode sensitivities. This range may extend from about 3,000 angstrom units to about 8,000 angstrom units. Preferance may exist for the UV region because of improved optical diffraction-limited performance and because of the generally high sensitivity of emulsions and photocathodes in this range. A further consideration is that the excitation mechanism must exhibit sufficient gain to overcome the insertion loss within the cavity due to transmission through refractive elements, reflections at interfaces, and other factors. If, for example, a 3 percent insertion loss exists due to the cascading of all internal causes, a gain of at least 3 percent per pass must exist to sustain oscillation.

The lens 16 produces diametrically opposite foci at points P on the surface 12 for any of a set of diameters, one of which is represented at D. All of the diameters of the set lie in a plane theta, since the surface 12 is cylindrical. The radiant flux pivots in the plane theta about the center of a sphere 28 whose radius establishes a constant focal length to the surface 12. The locus of the foci P defines a line scan 20 of the surface 12.

The instantaneous optical axis 21 coincides with the designated diameter D and with the instantaneous mode of oscillation of the lasing medium. The line scan 20 is circularly curved and the cylindrical surface 12, being non-spherical, spoils interferometric reinforcement at points on the surface 12 displaced from the locus of points P in the plane theta.

The lens 16 is mounted on the axis 26 concentrically with the surface 12 and is nodally mounted with respect to the modes of oscillation of the lasing medium 18. A bisecting plane 22 normal to the instantaneous optical axis 21 bisects the lens 16 and the surface 12. The central nodal point 24 of the resonator 10 is in the plane theta and at the origin of the z axis 26. Light flux traversing the plane 22 is normal thereto.

As FIG. 1 shows, the cylindrical surface 12 is tangent to the imaginary sphere 28. If scanning in a plane removed from the plane theta is desired (to yield an area scan or "raster"), the surface 12 is in fact spherically curved, to conform to the sphere 28, rather than cylindrically curved. Cylindrical curvature of the surface 12 is sufficient, however, for interferometric reinforcement permitting one degree of freedom (scan in a single plane), which is all that is desired in many important applications.

Inasmuch as the lens 16, which is passive, and the active lasing medium 18 are physically separate, the lens can be a Luneberg or equivalent type, corrected for spherical aberration by variation of its index of refraction in a radial direction. In this way, the focal points P can be made diffraction-limited in size to provide maximum resolution.

The means defining the surface 12 is partially light-transmitting. Therefore, if a transparency or unexposed emulsion is brought into contact with the outside of the means defining the surface 12, the radiant flux either is transmitted by the transparency in accordance with its immediate optical transmittance or exposes the emulsion in accordance with the modulating intensity variation. If the focused light flux is caused to traverse a regular pattern across the film surface (i.e., to scan), then the temporal variations in intensity are directly related to the spatial pattern in the emulsion.

Figure 2:
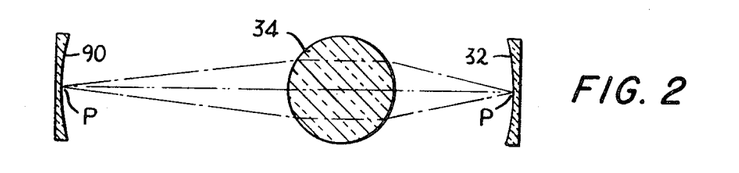
FIG. 2 is a fragmentary, highly schematic view of a second embodiment of apparatus according to the invention.

FIG. 2 shows spherical surfaces 30 and 32 between which is mounted a lens 34. The radii of curvature of the spherical surfaces 30 and 32 may be equal or, as shown, unequal, each of the spherical surfaces being separated from the central nodal point by a distance equal to the respective radii of the surfaces.

The apparatus of FIG. 1 is resonant, causing reinforcement upon each pass, but is degenerate in that there is no preferred mode of oscillation of the lasing medium. That is, the cavity center is the midpoint of all diameters which are equally likely to represent an interferometric axis of a laser oscillation. To produce a controlled scan, the lasing medium is activated in accordance with the invention in a desired mode or modes. FIGS. 3–11 show various means for accomplishing this. The devices disclosed in FIGS. 3–11 provide significant advantages as compared to selective unspoiling techniques, including absence of optical obstructions in the resonator cavity and facilitation of laser idling.

The latter concept involves excitation in two stages. A general excitation is imparted to the entire volume by dc or rf means to a level below the threshold of oscillation. This may be regarded as a bias or idler level. A localized excitation is imparted by electron collision in the region of the mode volume to raise a sufficient number of atoms into an excited state beyond the threshold for oscillation. Thus, selective excitation exists in the region determined by the position of the electron beam.

Figures 3, 4:
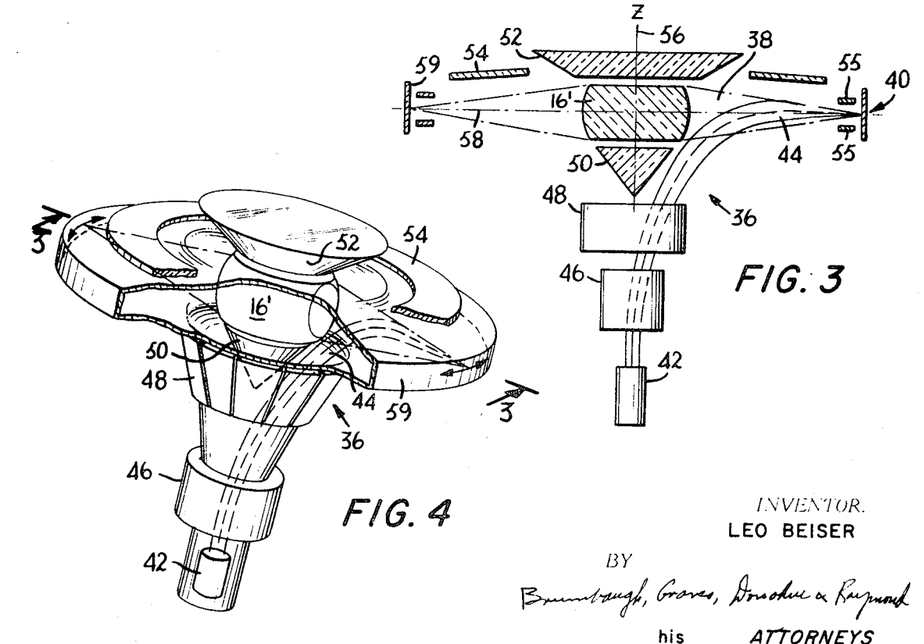
FIG. 3 is a more detailed schematic view of the apparatus of FIG. 1, showing provision for scanning through a full 360°.
FIG. 4 is a partly broken away perspective view of a practical form of the apparatus of FIGS. 1 and 3.

FIGS. 3 and 4 disclose apparatus 36 for controlling the spatial location of laser oscillations in a lasing gaseous medium 38 in an optical system 40 including a lens 16'. An electron gun 42 is provided for generating an electron flux 44. The electron flux traverses the gaseous lasing medium 38 to activate a desired mode of oscillation. A circular span is imparted to the electron beam by application of phase quadrature deflection amplitudes $R \sin \omega t$ and $R \cos \omega t$, where R determines the radius of circular scan and $\omega$ is established by the scan rate.

Scanning, positioning, and shaping means are provided including electric of magnetic deflection and focus means 46, an astigmatism corrector 48, a conical mirror electrode 50, a frustoconical mirror electrode 52, and an annular mirror electrode 54. The generating, scanning, positioning, and shaping means 42, 46, 48, 50, 52 and 54 are positioned along a given z axis 56 to permit scanning through 360° in a plane 58 normal to the z axis 56. The axis 56 corresponds to the axis 26 (FIG. 1), and the plane 58 to the plane theta. Scanning is effected on a cylindrical cavity resonator wall 59, corresponding to the wall 12.

The astigmatism generated by the astigmatism corrector electrodes is complementary to that produced by the mirror electrodes 50, 52, and 54, compression and rarefaction fields being synchronously applied to the astigmatism corrector electrodes. The astigmatism correction and deflection assemblies may be interchanged in position.

At the terminus of the electron beam appear annular electrodes 55 for precision positioning of the beam in the z-direction. FIGS. 3 and 4 show the wall 59 as curved cylindrically to provide optical reinforcement sustaining laser oscillation. This shape establishes oscillation geometry in a given plane, since any surface displaced from each plane is associated with an increased resonator loss, and defocusing and loss of efficiency result. In addition, the cylindrical shape simplifies fabrication as compared to a spherical shape.

A preferred plane may be established by other selection means, such as reduction of the width of the cylinder to a circular line or tapering to an inward-directed edge. The major requirement for the width of the edge is that it exceed the diffraction-limited spot size for most of the spot energy. Positioning electrodes may be used, as shown in FIGS. 3 and 4, intentionally to displace the spot in the z-direction, or to confine the spot locus to a plane.

Figures 5, 6, 7:
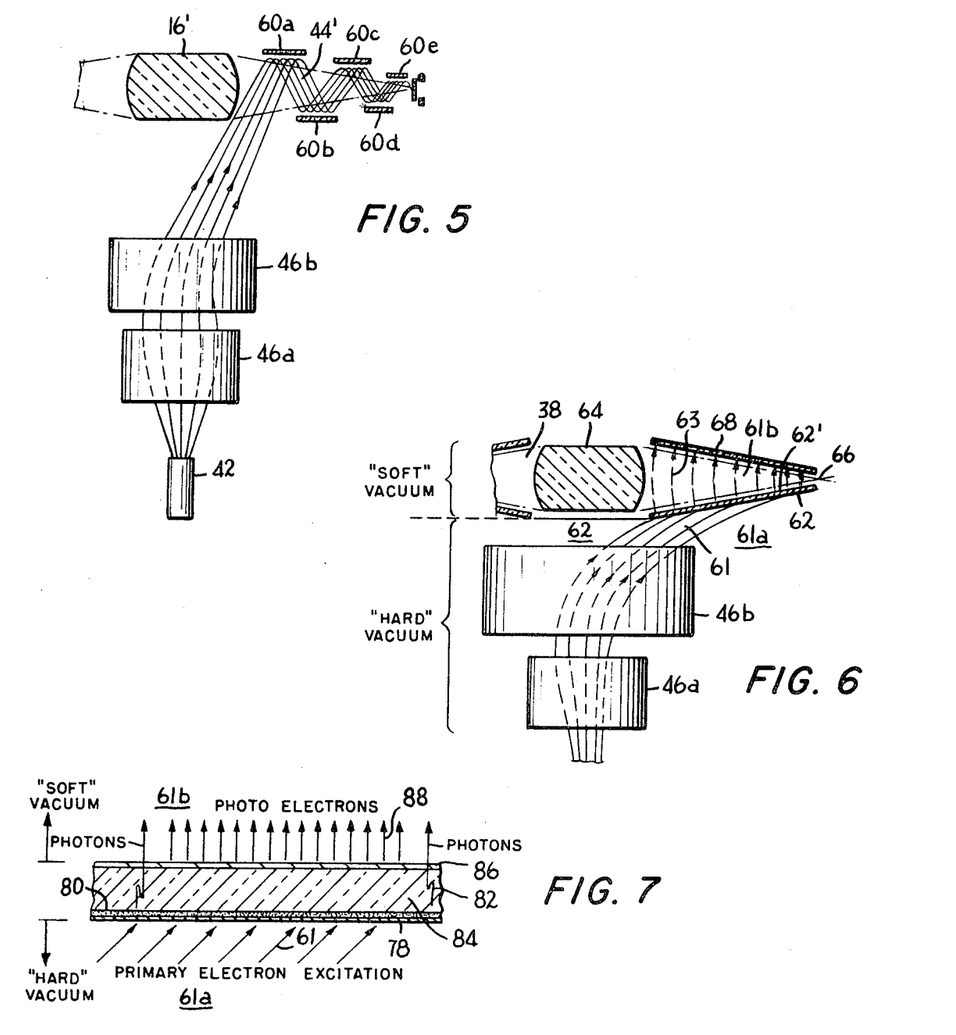
FIGS. 5–7 are fragmentary schematic views of three different modifications of the apparatus of FIGS. 3 and 4.

FIG. 5 shows another embodiment, in which electric or magnetic focus means 46a and deflection means 46b and annular flat electron mirrors 60a, 60b, 60c, 60d, and 60e are employed. The potentials on the mirrors 60a–60e are generally increasing but, at maximum, are less than the accelerating potential of the electron gun 42. They are adjusted to provide proper electron flow throughout all reflections. The electron mirrors 60a–60e produce relatively aberrationless multiple reflections across the mode volume, and no astigmatic correction is required. All electrodes other than the electron gun 42 can be mounted outside the glass enclosure. Mode volume is traversed in N passes by converging electron flux 44′, the traversing flux diameter corresponding approximately to the diameter of the mode volume in that region.

The electron beam velocity is of course high with respect to the scan velocity so that the mode volume is not seriously displaced from the electron flux during scan in the scanning plane.

Because the mode volume may operate optimally in a softer vacuum than the relatively hard vacuum optimum for control of the electron beam emanating from the electron gun 42, the electron gun 42 may be mounted in spaced-apart relation to the gaseous lasing medium 38 for generating a beam of electrons 61 (FIG. 6) that traverses a hard vacuum 62 at lower pressure than the pressure of the gaseous lasing medium 38. Secondary electrons 63 generated by the primary electrons constitute the electron flux which directly activates the lasing medium 38. This isolation avoids excessive interaction of the electron beam 61 with gas molecules in the gun-deflection-focus region. Two pressurized compartments 61a and 61b are separated by a membrane 62 formed of a material such as aluminum oxide. The membrane 62 converges from the lens 64 to the mode terminus 66 with respect to an accelerator 68 for the secondary electrons 63. The surface 62′ of the membrane in the higher pressure region may be a high secondary electron emitter such as potassium chloride (KCl). The electron source, focus and deflection means are in the lower pressure region 61a, where beam ballistics is well controlled. The secondaries released from the higher pressure surface 62′ are accelerated by the electrode 68 to traverse the mode volume to provide excitation above the lasing threshold. The electrons in the mode volume may be grid-controlled with a higher potential grid near the emitter and a lower potential anode accelerator.

Typical secondary emission gains for aluminum oxide membranes 700 angstrom units thick are 2 at 3 KV, 6 at 4 KV, and 7 at 5 KV.

Another method of isolating the electron deflection and flow region from the discharge region is to employ a photoelectric barrier as a separator between the hard and soft vacuum regions, as shown in FIG. 7. In general, this system is like that of FIG. 6 with a glass substrate separator replacing the membrane.

In FIG. 7, the primary electrons 61 traverse a hard vacuum 61a and strike an aluminizing layer 78 having a phosphor photon emitter 80. Photons 82 traverse a glass substrate separator 84 and impinge on a photocathode 86, causing emission of photoelectrons 88 which are accelerated in the soft vacuum 61b to activate the lasing medium in the desired mode. The remainder of the system is like that of FIG. 7.

The electron and photon energies may be determined as follows:

Assume a P-11 type phosphor having an efficiency of 0.1 watts of light flux per watt excitation. For a power input of 10 watts, derived from 1 milliampere at 10 KV, 1 watt of light flux is available, peaked at about 4,600 angstrom units. If an S-20 type photocathode having a radiant efficiency of 0.064 amps/watt is employed, 0.064 amperes will be emitted due to 1 watt excitation. If the photoelectrons are accelerated through 100 volts, then 6.4 watts of photoelectrons excitation is available. Thus, a maximum of 1 watt of photon flux and approximately 6 watts of photoelectrons are available for mode volume excitation, under these typical conditions.

Figure 8:
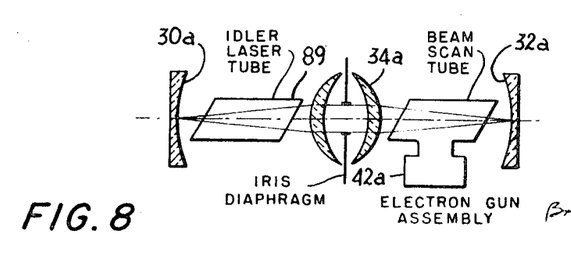
FIGS. 8–11 are schematic views of three additional embodiments of apparatus according to the invention, adapted for scanning over a limited subtense.

FIG. 8 shows an embodiment of the invention employing refractive optics and adapted for limited scan. A lens 34a is centrally mounted between conjugate reflective surfaces 30a and 32a. In the optical path between the lens 34a and the surface 30a, a laser idler tube 89 is mounted. The tube 89 includes means for pumping the lasing medium therein to an elevated energy level which is somewhat below the lasing threshold. An electron gun assembly 42a is mounted in the optical path between the lens 34a and the other surface 32a. The electron gun assembly 42a is a modified Pierce gun having Brewster windows transparent to light from the tube 89. Scanning by a beam scan tube within the assembly 42a selectively activates desired modes in the tube 89 by interaction between the electromagnetic radiation from the tube 89 and an electron beam within the assembly 42a.

Figure 9:
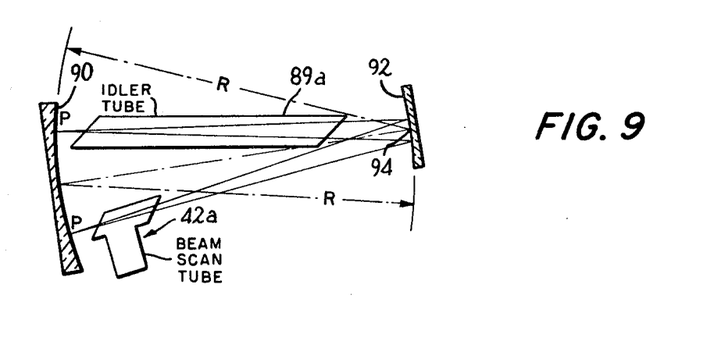
Figure 10:
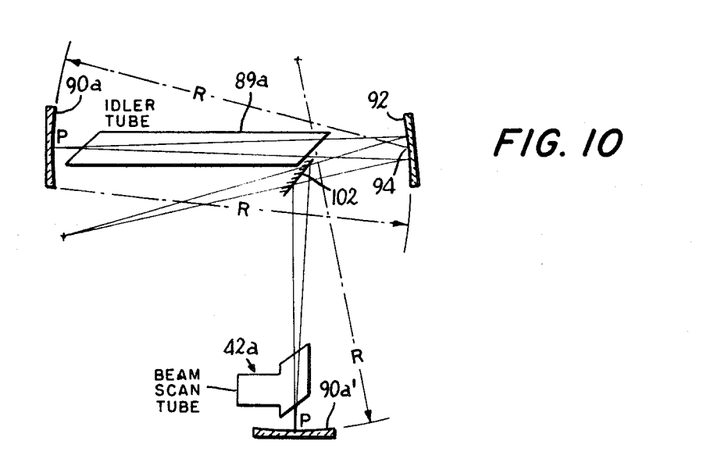
Figure 11:
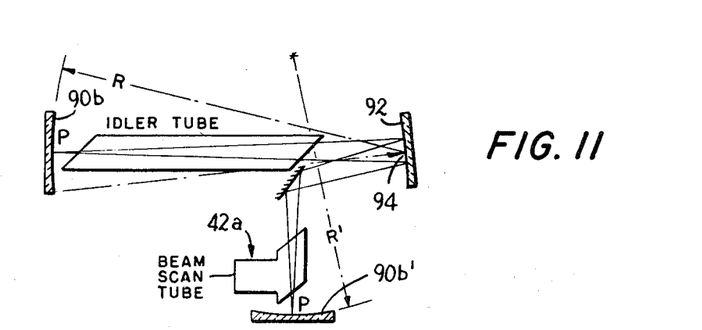

FIG. 9 discloses a minimum-loss system having curved-surface means 90 partially reflective inwardly and central reflector means 92 mounted at the origin 94 of the radius R of the curved-surfaced means 90. The use of only two reflective surfaces, the central lens being eliminated, so reduces optical losses that low gain media (e.g., HeNe having a transition at 6,328 angstrom units) can be employed. This gas or another lasing medium is within an idler tube 89a in the cavity between the surface 90 and the central, nodally mounted reflector 92. The central reflector 92 produces an optical folding at the origin 94, which is a nodal point, to produce conjugate foci at points P on the surface 90. The locus of the foci defines a limited scan of the surface 90.

The central reflector 92 is spherical and has a radius R equal to the radius of the surface 90, and the surface 90 and central reflector 92 are spaced apart a distance equal to their common radius. The surface 90 may be split in two for convenience.

In an expanded form (FIG. 10), the surface means 90 comprises two mirrors 90a and 90a' of equal radii (FIG. 10), one mounted at each focus. An additional folding mirror 102 is provided for imaging on the mirror 90a'. In another expanded form (FIG. 11), the mirrors 90b and 90b' have different radii (R and R', respectively), each mirror being concentric with the central nodal point 94, as in the other embodiments. In both expanded forms, the central mirror is idealized as an ellipse whose two foci terminate on the conjugate mirrors. These forms are aberrationless on axis (non-scanning) and free of spherical aberration even during scan.

As FIGS. 8-11 show, the lasing medium may be in only one of the optical paths between the central reflector or refractor and the conjugate image surfaces rather than in both, as in FIG. 1, for example. In all of the embodiments, the selective excitation means operates on the lasing medium in spaced-apart relation to the mode endings. Thus, the control cross-section need not be as fine as in the case where selective unspoiling is employed at mode endings. The excitation means can activate the modes by radio-frequency energy transfer, shock-wave plasma energy transfer, photon flux energy transfer, or electron flux energy transfer.

Figure 12:
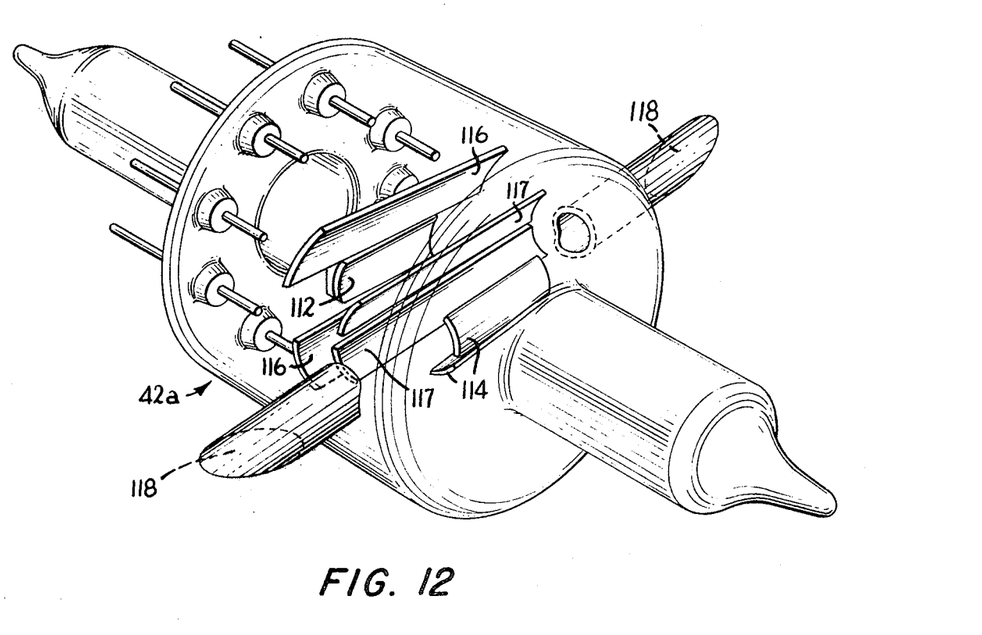
FIG. 12 is a perspective view of a Pierce gun suitable for use in the apparatus of FIGS. 8–11.
Figure 13:
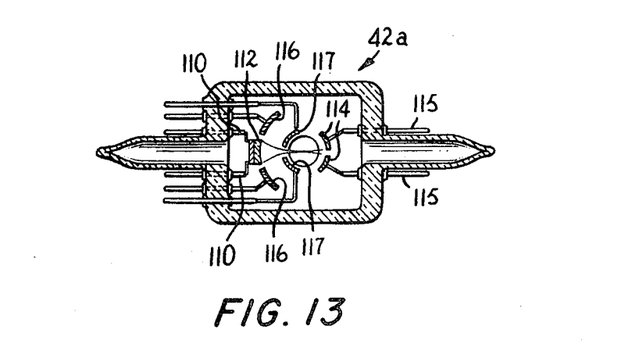
FIG. 13 is a sectional view of the apparatus of FIG. 12.

FIGS. 12 and 13 show a modified form of Pierce electron gun 42a suitable for use in the apparatus of FIGS. 8-11. Heater terminals 110 heat a dispenser-type cathode 112 to emit electrons, which are collected by split collector electrodes 114 connected to terminals 115. Electrodes 116 and 117 shape and position the electron beam, in the form of a ribbon. Brewster windows 118 are provided for passage of the electromagnetic radiation.

Thus, there are provided in accordance with the invention novel and highly-effective laser systems and laser controls systems free of off-axis and spherical aberrations, by virtue of which extremely high resolution scanning (hundreds of line pairs per millimeter) may be obtained during recording or read-out. At the same time, a bandwidth of tens to hundreds of megacycles per second may be realized as a result of rapid scanning across closely-spaced elements of information.

Modifications of the representative embodiments disclosed above will occur to those skilled in the art, including optical transformation of the focal surfaces and lenticular elements to some other form while maintaining the resonant integrity of the cavity, as disclosed in G. Toraldo di Francia, Proc. Symposium on Optical Masers, p. 157, Polytechnic Press (1963), and G. D. Boyd and H. Kogelnick, Bell System Technical Journal, 41, 1,347 (1962).

I claim:

1. In combination, a resonant cavity having optical-surface means, said surface means being partially reflective; image-forming means, there being a first optical path between said image-forming means and a first portion of said surface means and a second optical path between said image-forming means and a second portion of said surface means, said first and second portions being located at conjugate foci of said image-forming means; an active lasing medium in at least one of said optical paths, said lasing medium being separate from said image-forming means and capable of sustaining a plurality of angularly related modes, means for pumping said lasing medium to a level below the lasing threshold, and excitation means for pumping selected regions of said active medium to a level above the lasing threshold so that selected ones of said angularly related modes will resonate.

2. Apparatus according to claim 1 wherein said lasing medium is in both of said optical paths.

3. Apparatus according to claim 1 wherein said lasing medium is in only one of said optical paths.

4. Apparatus according to claim 3 wherein said excitation means comprises a beam scan tube positioned in the other of said optical paths.

5. Apparatus according to claim 1 wherein said image-forming means is a lens, said lens being corrected for spherical aberration by variation of its index of refraction in a radial direction so that said foci are substantially diffraction-limited in size.

6. Apparatus according to claim 1 wherein said first and second portions of said surface means are of different curvature.

7. Apparatus according to claim 1 wherein said first and second portions of said surface means are of equal radii.

8. Apparatus according to claim 1 wherein said surface means is cylindrical and spoils interferometric reinforcement at points on said surface means displaced from a scanning plane normal to the cylinder axis.

9. Apparatus according to claim 1 wherein said image-forming means is a mirror, said mirror and surface means being curved about equal radii and being spaced apart from each other a distance equal to their common radius.

10. Apparatus according to claim 1 wherein said surface means comprises two spherical mirrors, one mounted 11. Apparatus according to claim 10 wherein said mirrors are of different curvature.

12. Apparatus according to claim 10 wherein said mirrors are of equal curvature.

13. Apparatus according to claim 1 wherein said excitation means pumps said lasing medium at positions spaced from mode endings.

14. Apparatus according to claim 1 wherein said excitation means comprises means for injecting electrons into said lasing medium at a position to cause the selected modes to resonate.

15. Apparatus according to claim 14 wherein said means for injecting electrons into said lasing medium comprises an electron gun generating a beam of primary electrons and means for positioning and shaping said beam, said electron gun and said positioning means being mounted symmetrically along a given axis to permit scanning through 360° in a plane normal to said axis.

16. Apparatus according to claim 15 wherein said positioning and shaping means comprises a conical mirror electrode means and aberration corrector electrode means.

17. Apparatus according to claim 15 wherein said positioning and shaping means further comprises annular mirror electrode means.

18. Apparatus according to claim 15 wherein said beam of primary electrons penetrates the mode volume.

19. Apparatus according to claim 15 wherein said beam of primary electrons is in spaced-apart relation to the lasing medium and by transfer process provides for excitation of the lasing medium.

20. Apparatus according to claim 14 wherein said means for injecting electrons into said lasing medium comprises an electron gun generating a beam of primary electrons, means for shaping ane positioning said beam, secondary emission means, said beam of primary electrons striking said secondary emission means and causing emission of secondary electrons and said secondary electrons penetrating the mode volume, and means maintaining a harder vacuum in the region traversed by said primary electrons than in the region traversed by said secondary electrons.

21. Apparatus according to claim 14 wherein said means for injecting electrons into said lasing medium comprises an electron gun generating a beam or primary electrons, means for positioning and shaping said beam, photoelectron emission means, said beam of primary electrons striking said photoelectron emission means and causing emission of photoelectrons and said photoelectrons penetrating the mode volume, and means maintaining a harder vacuum in the region traversed by said primary electrons than in the region traversed by said photoelectrons.

22. Apparatus according to claim 1 wherein said selected modes are reflected within said cavity by said surface means, and said image-forming means is passive and mounted nodally with respect to said surface means.

* * * * *

PO-1050
(5/69)

UNITED STATES PATENT OFFICE
CERTIFICATE OF CORRECTION

Patent No. 3,739,296  Dated June 12, 1973

Inventor(s) Leo Beiser

It is certified that error appears in the above-identified patent and that said Letters Patent are hereby corrected as shown below:

On the Cover Page, after [56] Other Publications, "Electron-Pumping" should be --Electron-Beam Pumping--; Col. 1, line 34, "outlines" should be --outlined--; Col. 4, line 48, "of" should be --or--; Col. 5, line 5, "each" should be --such--; Col. 8, line 36, after "mounted" should be --at each mode focus--; Col. 9, line 6, "ane" should be --and--; Col. 10, line 1, "or" should be --of--.

Signed and sealed this 14th day of May 1974.

(SEAL)
Attest:

EDWARD M. FLETCHER, JR.
Attesting Officer

C. MARSHALL DANN
Commissioner of Patents